United States Patent

[11] 3,623,528

[72] Inventors Frederick J. Kovac
Bath;
Kevin B. O'Neil, Akron, both of Ohio
[21] Appl. No. 18,425
[22] Filed Mar. 11, 1970
[45] Patented Nov. 30, 1971
[73] Assignee The Goodyear Tire & Rubber Company
Akron, Ohio

[54] BIAS-BELTED PNEUMATIC TIRE
6 Claims, 2 Drawing Figs.

[52] U.S. Cl. ................................................... 152/356, 152/361
[51] Int. Cl. .................................................... B60c 9/02
[50] Field of Search............................................ 152/354, 361, 356

[56] References Cited
UNITED STATES PATENTS
| | | | |
|---|---|---|---|
| 3,068,926 | 12/1962 | Jacob et al. ................... | 152/354 |
| 2,976,905 | 3/1961 | Beckadolph................... | 152/354 |
| 2,939,502 | 6/1960 | Hindin et al. ................. | 152/361 X |

FOREIGN PATENTS
| | | | |
|---|---|---|---|
| 1,025,285 | 2/1958 | Germany...................... | 152/361 |

*Primary Examiner*—Arthur L. La Point
*Assistant Examiner*—George H. Libman
*Attorneys*—F. W. Brunner and Harlan E. Hummer

ABSTRACT: A bias-belted pneumatic tire having a pair of carcass plies sandwiched between a pair of belts for annularly reinforcing the tire.

PATENTED NOV 30 1971 3,623,528

INVENTORS
FREDERICK J. KOVAC
KEVIN B. O'NEIL
BY
Harlan E. Hummer
ATTORNEY

BIAS-BELTED PNEUMATIC TIRE

BACKGROUND OF THE INVENTION

The invention concerns a bias-belted tire, which is preferably tubeless, having an air-impermeable innerliner and at least two plies forming the carcass or body of the tire. Each of the carcass plies is reinforced with cords disposed at similar biased angles between the tire beads, which define the circular openings for receiving the wheel rim. A number of rather narrow strips or belts with reinforcing cords at generally lower degree biased angles, are embedded in the tire body in the area of the tread to annularly reinforce the tire. There are any number of combinations of belts and carcass plies for producing desired ride and durability characteristics. The invention is directed to such a combination.

Briefly stated, the invention is in a bias-belted tire having a couple of carcass plies with reinforcing cords which are disposed between the beads at angles within a predetermined range of angles as will hereinafter be described. The carcass plies in the area of the tread are sandwiched between a pair of belts with reinforcing cords which are disposed at angles within a second predetermined range of angles which will hereinafter be disclosed. It has been found that this particular combination has unique ride and durability characteristics.

DESCRIPTION OF THE DRAWING

The following description of the invention will be better understood by having reference to the annexed drawing, wherein.

DESCRIPTION OF THE INVENTION

Figure 1:
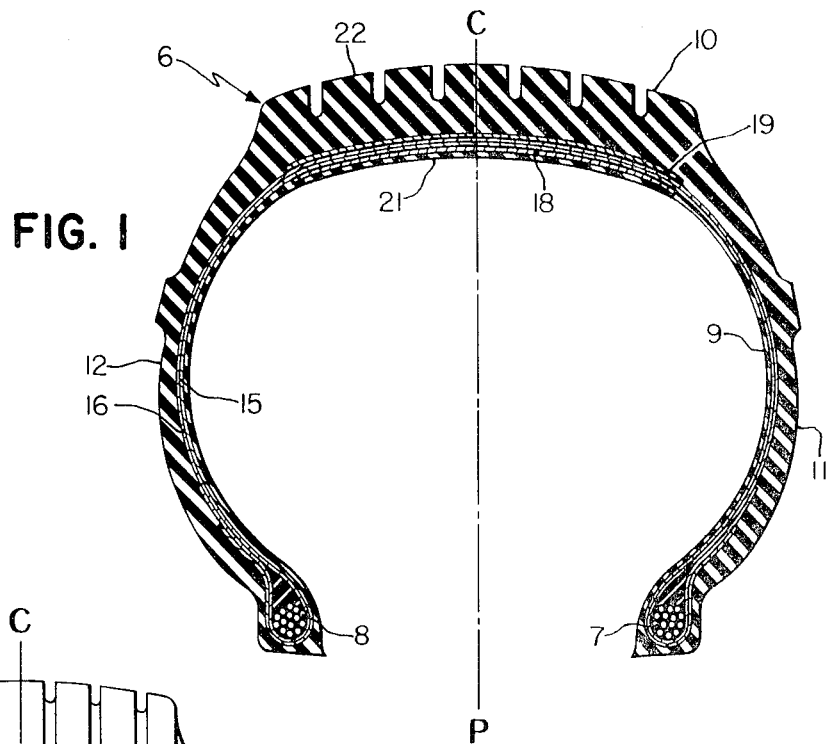
FIG. 1 is a cross section of a pneumatic tire produced in accordance with the invention.
Figure 2:
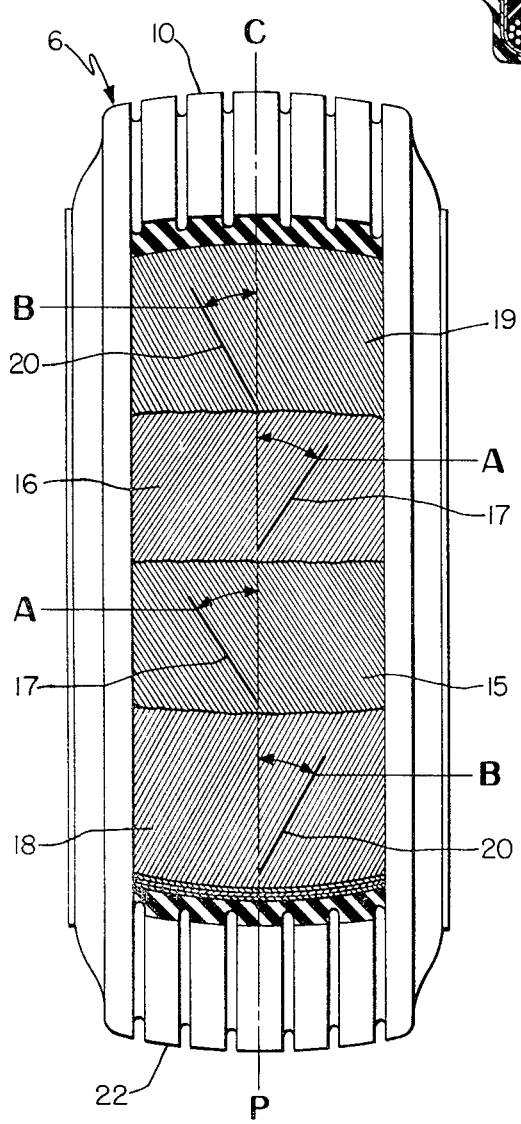
FIG. 2 is a cutaway section of the tire illustrating the angular disposition of the tire cords reinforcing the carcass plies and belts.

Referring more particularly to the drawing, there is shown a pneumatic tire, generally indicated at 6, suitable for use on passenger automobiles. The tire 6 is preferably tubeless, but a separate innertube can be used for holding air, under pressure, within the tire. The tire 6, comprises a pair of annular beads 7 and 8 mountable on a wheel rim; a bias ply tire body or carcass 9 extending between, and wrapped around the beads 7 and 8; an annular tread 10 carried by the tire carcass 9 in opposed relation to the beads 7 and 8; and a pair of sidewalls 11 and 12 extending from the tread 10 and terminating at the beads 7 and 8.

The configuration of the tire 6 is symmetrical from a plane (C-P) passing through the midcircumferential centerline of the tread 10, such plane hereinafter referred to as the centerplane (CP) of the tire 6.

The tire carcass 9 comprises a plurality of carcass plies 15 and 16 composed of rubber material reinforced with a number of generally parallel cords, e.g. cord 17. The tire cords 17 are preferably made from polyester, but can be composed of nylon or rayon. The cords 17 of the carcass plies 15 and 16 are disposed at angles (A) in the broad range of from about 28° to about 40° and in the preferred range of from about 30 to about 36° measured in opposite directions from the centerplane of the tire 6, when the tire is cured and uninflated.

A pair of belts 18 and 19 are provided for reinforcing the tire 6 annularly. The belts 18 and 19 are disposed on either side of the carcass plies 15 and 16 in the area of the tread 10 and sandwiched the plies therebetween. The belts 18 and 19 are composed of strips of rubber material reinforced with a number of generally parallel cords, e.g. cords 20, which are preferably made from fiber glass, but can be formed from rayon or metal.

The reinforcing cords 20 of the belts 18 and 19 are disposed at angles B of from about 25° to about 36° measured in opposite directions from the centerplane of the tire 6, when the tire is cured and uninflated.

The belt 18 is, preferably, adjacent the inner crown or innerliner 21 of the tire 6, and the belt 19 is, preferably, embedded in the tire 6 in closer spaced relation from the outer periphery 22 of the tread 8 than the carcass plies 15 and 16.

Thus there has been described a new and novel bias-belted tire, wherein a pair of carcass plies, with reinforcing cords of polyester, are sandwiched between a couple of belts with reinforcing cords of fiber glass. The particular location of the belts relative the carcass substantially reduces the possibility of a separation failure between the outer belt and adjacent rubber material, including the tread and sidewall. This type belt construction favorably affects the durability characteristics of the tire and increases tread wear by providing greater annular reinforcement and support for the tire.

While certain representative embodiments and details have been shown for the purpose of illustrating the invention, it will be apparent to those skilled in the art that various changes and modifications may be made therein without departing from the spirit or scope of the invention.

What is claimed is:

1. A bias-belted pneumatic tire, comprising in combination:
    a. a carcass consisting of a single pair of plies disposed in abutting relation in the area of the tread and having reinforcing cords disposed at angles A of from about 28° to about 40° measured in opposite directions from the centerplane of the tire, when the tire is cured and uninflated; and
    b. a pair of belts annularly disposed in the area of the tread and sandwiching the pair of carcass plies therebetween for reinforcing the tire annularly, the belts having reinforcing cords disposed at angles B of from about 25° to about 36° measured in opposite directions from the centerplane of the tire, when the tire is cured and uninflated.

* * * * *

UNITED STATES PATENT OFFICE
CERTIFICATE OF CORRECTION

Patent No. 3,623,528                    Dated November 30, 1971

Inventor(s) Frederick J Kovac and Kevin B O'Neil

It is certified that error appears in the above-identified patent and that said Letters Patent are hereby corrected as shown below:

Add Claims 2-6 as follows:

2. The tire of Claim 1, wherein the reinforcing cords of the carcass plies are polyester.

3. The tire of Claim 2, wherein the reinforcing cords of the belts are fiberglass.

4. The tire of Claim 2, wherein the reinforcing cords of the belts are composed of metal.

5. The tire of Claim 2, wherein the reinforcing cords of the belts are composed of rayon.

6. The tire of Claim 1, wherein the angles (A) are in the preferred range of from about 30 to about 36 degrees.

Signed and sealed this 4th day of July 1972.

(SEAL)
Attest:

EDWARD M. FLETCHER, JR.                ROBERT GOTTSCHALK
Attesting Officer                      Commissioner of Patents